United States Patent
Berube et al.

(10) Patent No.: US 11,703,128 B2
(45) Date of Patent: Jul. 18, 2023

(54) SPRING LOADED SLEEVE VALVE WITH CONTROLLED CLOSING FORCE

(71) Applicant: Hamilton Sundstrand Corporation, Charlotte, NC (US)

(72) Inventors: Connor Berube, Bloomfield, CT (US); Myles R. Kelly, Willimantic, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/484,078

(22) Filed: Sep. 24, 2021

(65) Prior Publication Data

US 2023/0109588 A1    Apr. 6, 2023

(51) Int. Cl.

| | |
|---|---|
| *F16K 1/12* | (2006.01) |
| *F02C 6/08* | (2006.01) |
| *F02C 9/18* | (2006.01) |
| *F04D 27/02* | (2006.01) |

(52) U.S. Cl.
CPC .............. *F16K 1/123* (2013.01); *F02C 6/08* (2013.01); *F02C 9/18* (2013.01); *F04D 27/023* (2013.01); *F04D 27/0215* (2013.01); *F16K 1/126* (2013.01); *F05D 2270/65* (2013.01)

(58) Field of Classification Search
CPC .. F16K 1/123; F16K 1/126; F02C 6/08; F02C 9/18; F04D 27/0215; F04D 27/023; F05D 2270/65
See application file for complete search history.

(56) References Cited

U.S. PATENT DOCUMENTS

| | | | |
|---|---|---|---|
| 3,792,716 A * | 2/1974 | Sime | F16K 1/126 137/220 |
| 3,825,026 A | 7/1974 | Salerno et al. | |
| 3,865,128 A * | 2/1975 | Zadoo | G05D 16/106 137/220 |
| 3,915,587 A * | 10/1975 | Rannenberg | F04D 27/0215 137/484 |
| 5,114,115 A | 5/1992 | Gillott | |
| 5,417,402 A | 5/1995 | Speybroeck | |
| (Continued) | | | |

FOREIGN PATENT DOCUMENTS

EP    3726032 A1    10/2020

OTHER PUBLICATIONS

European Search Report for EP Application No. 22197803.4 dated Feb. 22, 2023.

*Primary Examiner* — Jesse S Bogue
(74) *Attorney, Agent, or Firm* — Carlson, Gaskey & Olds, P.C.

(57) ABSTRACT

A sleeve valve includes an inlet port and an outlet port. A sleeve is movable to close flow from the inlet port to the outlet port. The sleeve valve has a sleeve biased to an open position at which it allows flow from the inlet port to the outlet port by a spring. Pressure in a pressure chamber urges the sleeve to a closed position at which it blocks flow from the inlet port to the outlet port. A line pressure conduit communicates the fluid chamber into the pressure chamber. Pressurized air is supplied to the pressure chamber through a selectively closed valve. The selectively closed valve is opened to allow the flow of high pressure air from a pressure source into the pressure chamber to move the sleeve to a closed position. A bleed air system for a gas turbine engine is also disclosed.

17 Claims, 6 Drawing Sheets

(56) References Cited

U.S. PATENT DOCUMENTS

| | | | |
|---|---|---|---|
| 6,684,898 | B2 | 2/2004 | Wiggins et al. |
| 7,147,430 | B2 | 12/2006 | Wiggins et al. |
| 7,264,017 | B2 | 9/2007 | Denike et al. |
| 7,926,270 | B2 | 4/2011 | Weaver et al. |
| 9,849,992 | B2 * | 12/2017 | Goodman ............... F02C 7/047 |
| 10,627,006 | B2 | 4/2020 | Heinrich et al. |
| 10,823,087 | B1 * | 11/2020 | DeFelice ................... F02C 9/18 |
| 2020/0095944 | A1 * | 3/2020 | Goodman ............. F01D 17/105 |
| 2020/0182161 | A1 * | 6/2020 | Greenberg ................ F02C 9/18 |

* cited by examiner

SPRING LOADED SLEEVE VALVE WITH CONTROLLED CLOSING FORCE

BACKGROUND OF THE INVENTION

This application relates to a sleeve valve which has a first mode for closing the valve when a line pressure exceeds a predetermined force, and also has a controlled closing mode.

Sleeve valves are known, and typically include a sleeve which is biased in one direction by a spring to an open position. A pressure force acts against the spring force and may close the sleeve when the pressure force exceeds the spring force.

One application for a sleeve valve is as an aircraft compressor system bleed valve. As known, in a gas turbine engine, the compressor has issues with stability at startup and other low power conditions. Thus, at low pressure a bleed valve opens to allow some of the compressed air to bleed outwardly. It is typical to have the valve in different passive positions at different engine operating conditions. As mentioned, it is open at low power for stability reasons. On the other hand, it is typically closed at high power to preserve efficiency.

SUMMARY OF THE INVENTION

A sleeve valve includes an inlet port and an outlet port. A fluid chamber connects the inlet port to the outlet port. A sleeve is movable to close flow from the inlet port to the outlet port. The sleeve valve has a sleeve biased to an open position at which it allows flow from the inlet port to the outlet port by a spring. The sleeve moves within a housing, and has a pressure chamber on opposed side of the sleeve from the spring. Pressure in the pressure chamber urges the sleeve to a closed position at which it blocks flow from the inlet port to the outlet port. A line pressure conduit communicates the fluid chamber into the pressure chamber. Pressurized air is supplied to the pressure chamber through a selectively closed valve. The selectively closed valve is opened to allow the flow of high pressure air from a pressure source into the pressure chamber to move the sleeve to a closed position.

A bleed air system is also disclosed.

These and other features of the present invention can be best understood from the following specification and drawings, the following of which is a brief description.

DETAILED DESCRIPTION

Figure 1:
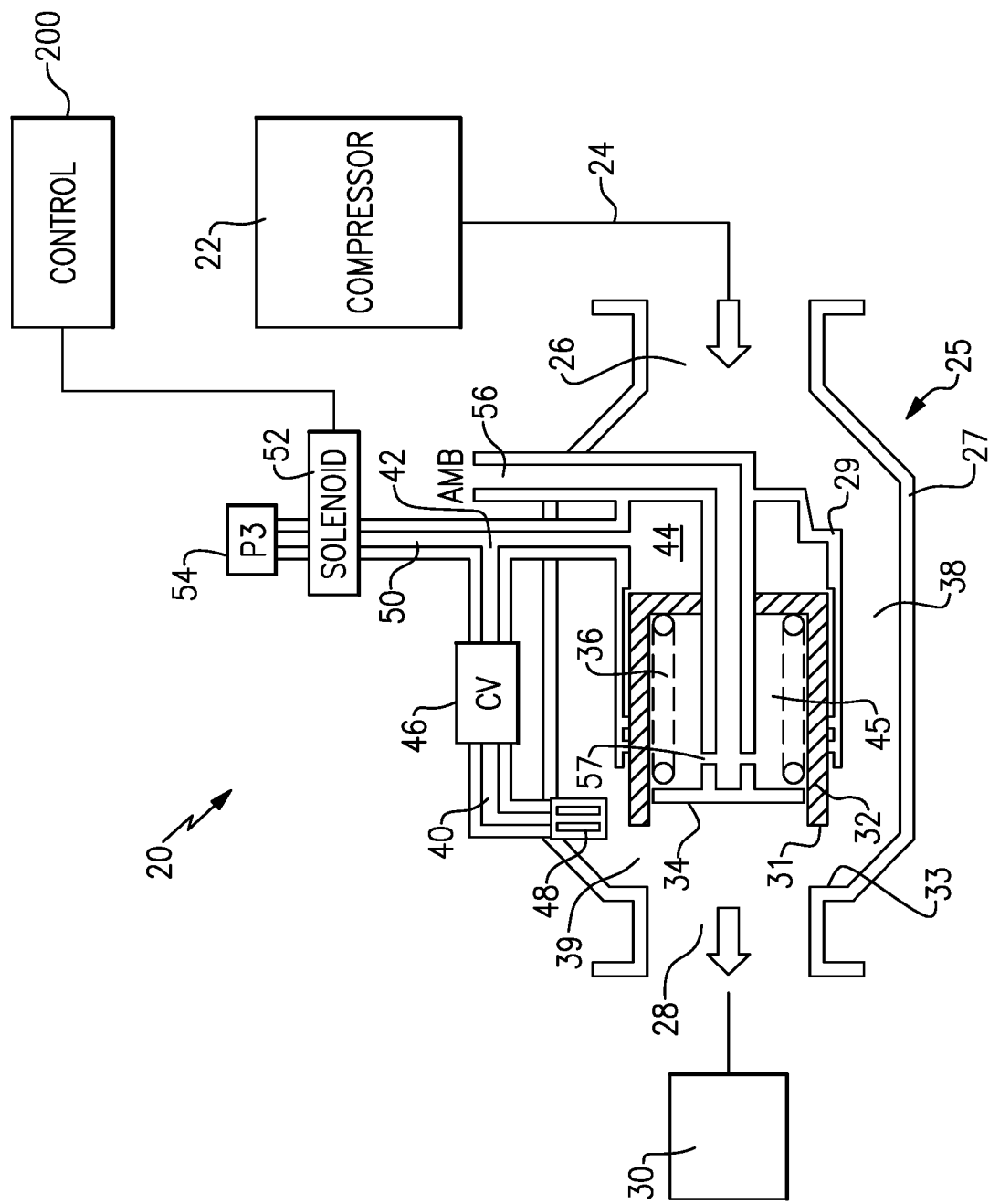
FIG. 1 shows a sleeve valve in an open position.

FIG. 1 shows a bleed valve system 20 for bleeding compressed air from a compressor 22 of a gas turbine engine at low pressure operation such as startup. As shown, a conduit 24 from the compressor 22 communicates pressurized air into an inlet 26 of a sleeve valve 25. The sleeve valve 25 has an outer housing 27 and an inner housing 29. A chamber 38 between the housings 27 and 29 receives air from the inlet 26 and delivers it to an outlet 28. Outlet 28 communicates air to a use 30. In some applications the use may simply be a dump to atmosphere.

A sleeve 32 is movable within the housing 29. As shown in the FIG. 1 position, a forward end 31 of the piston is spaced from a seat 33 on the housing 27. In the FIG. 1 position, air can thus pass from inlet 26 to chamber 38 and then to outlet 28 through area 39 and to use 30. A housing wall 34 supports a spring 36 that biases the sleeve 32 to this open position. Air from the chamber 38 may communicate into a line pressure conduit 40 leading through a check valve 46, and into port 42 to reach a pressure chamber 44. A filter 48 may filter impurities from the air before it reaches the conduit 40. As the pressure of the air at inlet 26 increases, the force in chamber 44 will also increase.

Further shown is high pressure conduit 50 communicating into the chamber 44 through a solenoid 52 to selectively communicate air from a high pressure source 54. A control 200 controls the solenoid 52.

As further shown in FIG. 1, a pressure in a chamber 45 defined between the sleeve 32 and the housing 34 acts in addition to the spring force from spring 36 to hold the sleeve 32 in the open position. There is a tap 56 communicating into the chamber 45 through ports 57. In the FIG. 1 embodiment, the tap 56 communicates to air at ambient pressure.

Figure 2:
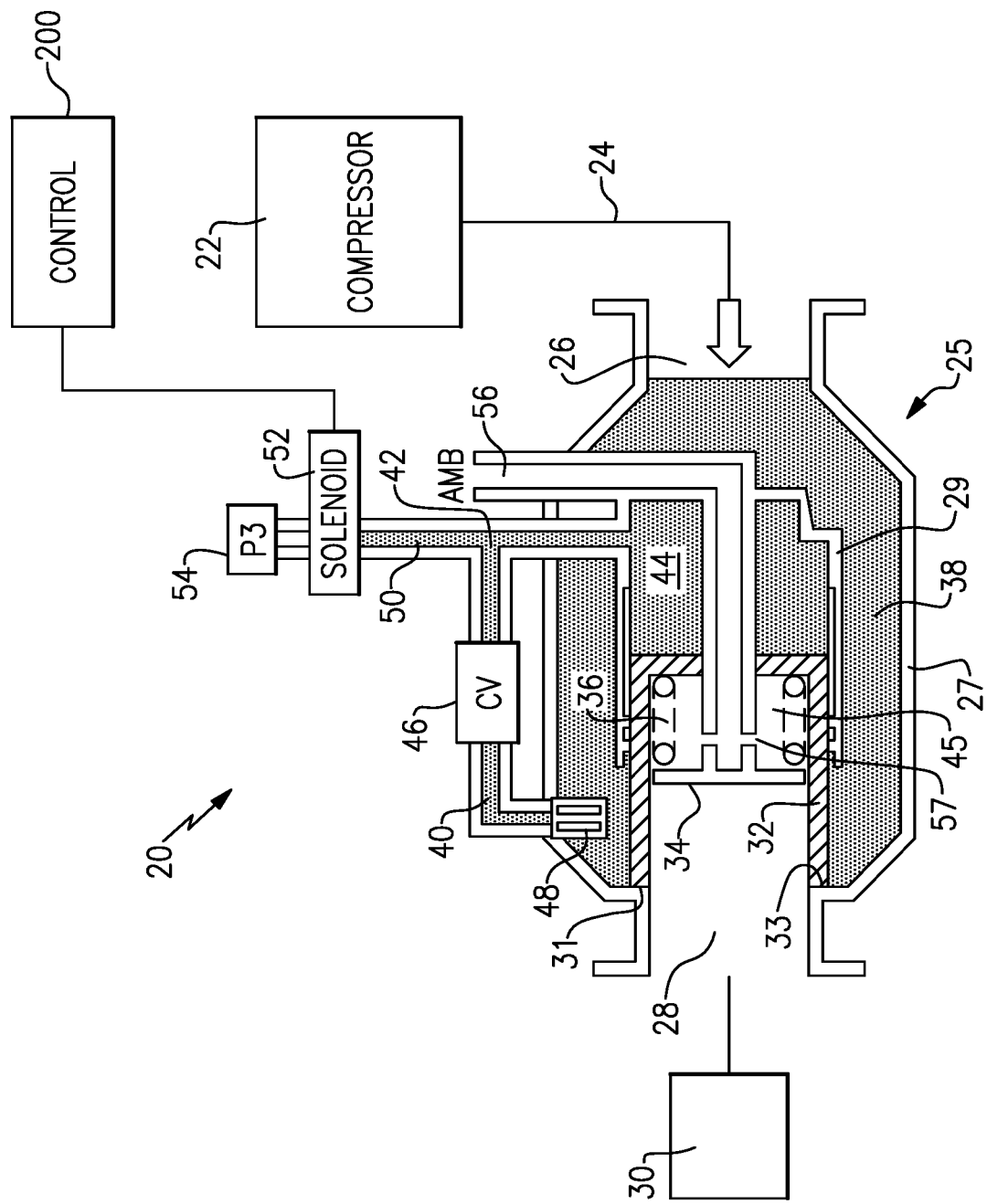
FIG. 2 shows a first closed mode of the sleeve valve of FIG. 1.

In FIG. 2, the air in chamber 44 has now exceeded the spring force of spring 36 and the sleeve 32 has moved to the closed position at which end 31 abuts seat 33 and airflow is blocked.

As known, a bleed valve is to close when the compressor 22 pressure exceeds a particular value. The function of the bleed valve is to bleed air at lower pressure operation. To continue to bleed air would cause efficiency losses to the associated gas turbine engine.

Thus, in FIG. 2, the air passes through the check valve 46 and conduit 40, and into chamber 44 to move the sleeve 32 to the closed position.

Figure 3:
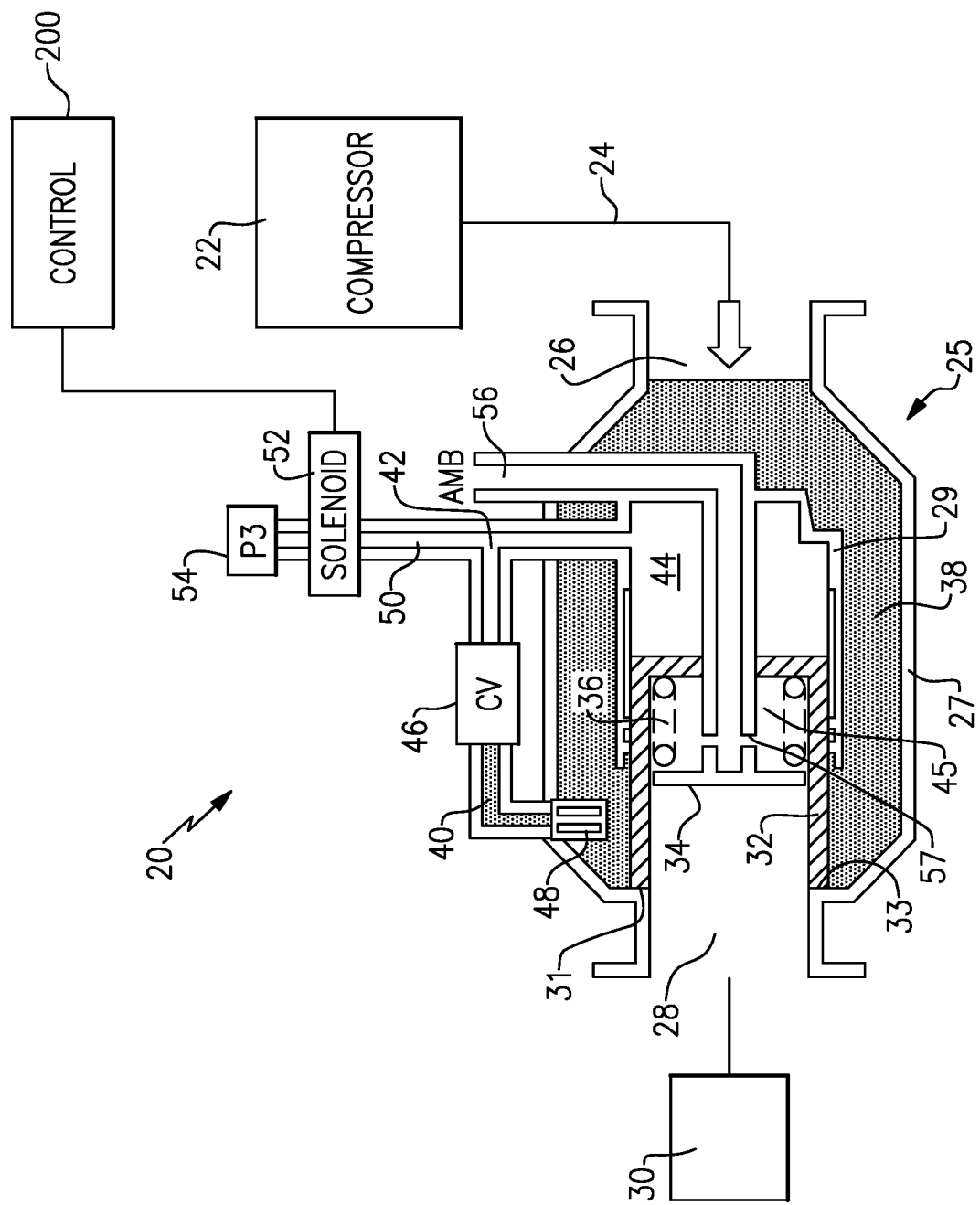
FIG. 3 shows a second closed mode of the sleeve valve of FIG. 1.

The control 200 has the ability to control the position and operation of the valve 25. As such, the control 200 may move the valve to a closed position such as shown in FIG. 3. In FIG. 3, the solenoid 52 has opened allowing air from the high pressure source 54 to reach the chamber 44. Now, the air from source 54 moves the sleeve 32 to the closed position such as shown in FIG. 3. Air from the source 54 cannot pass back upstream through the check valve 46, and thus it does not reach the chamber 38. The control can move the valve 25 to this closed position to achieve desired efficiency, such as at high power operation, (e.g. take off of the associated engine). However, at lower power operation (e.g. startup) the control may close the solenoid to allow the valve 25 to open. Should the control 200 or solenoid 52 fail, say from an electrical problem, the valve will still move passively in response to the inlet pressure as shown in FIGS. 1 and 2.

Figure 4A:
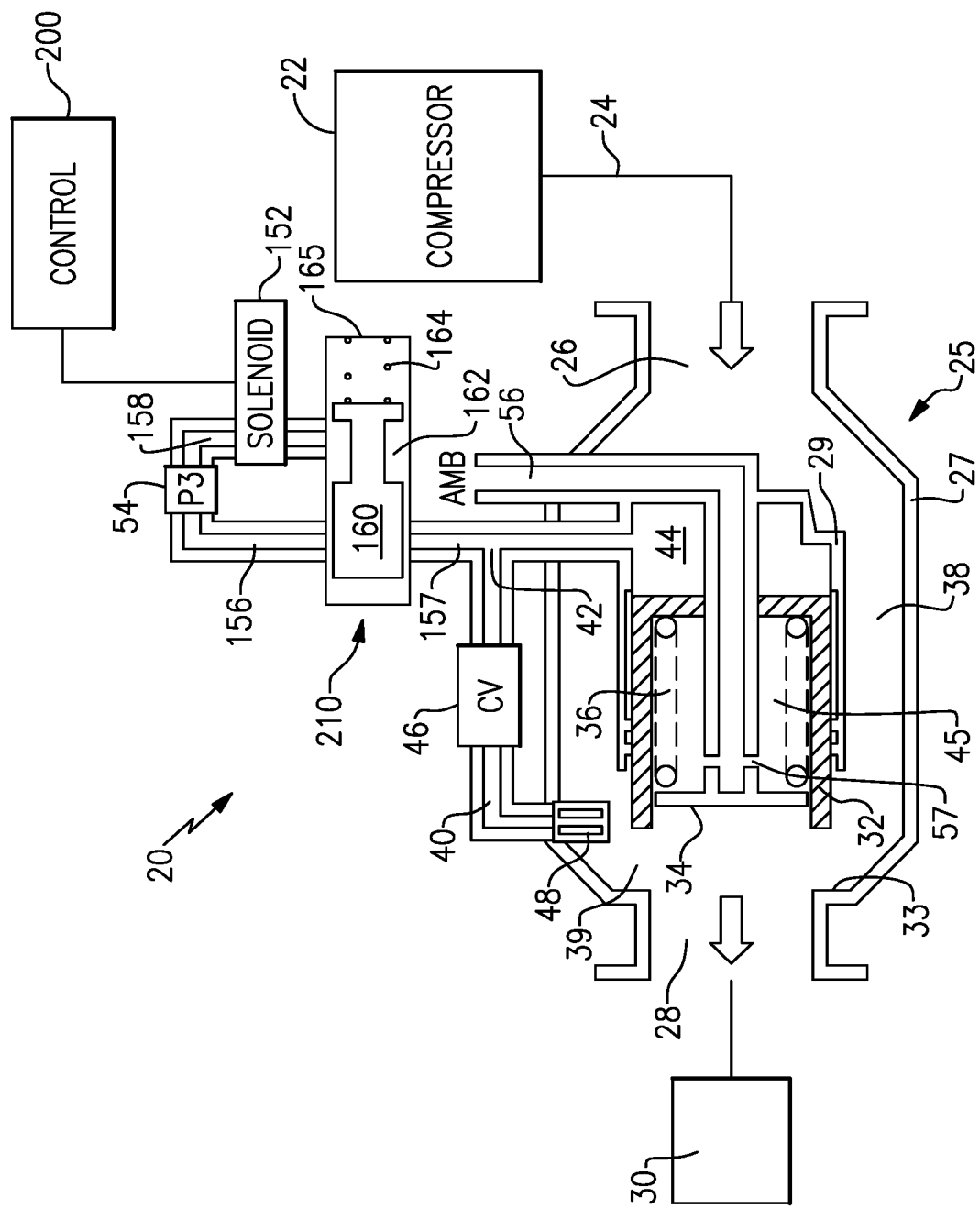
FIG. 4A shows a second embodiment valve in a closed position.

FIG. 4A shows another embodiment 200 which is generally similar to the FIGS. 1-3 embodiment 25 other than the failsafe connection. As shown in FIG. 4A, solenoid 152 controls the flow of air from source 54 through a first conduit 158. A larger conduit 156 also selectively receives air from source 54. However, as shown in FIG. 4A, a relay valve 210 has a piston 160 which is biased by a spring force 164 in a valve housing 165 to a closed position at which it blocks communication between conduit 156 and conduit 157. A groove 162 is shown in the piston 160.

Figure 4B:
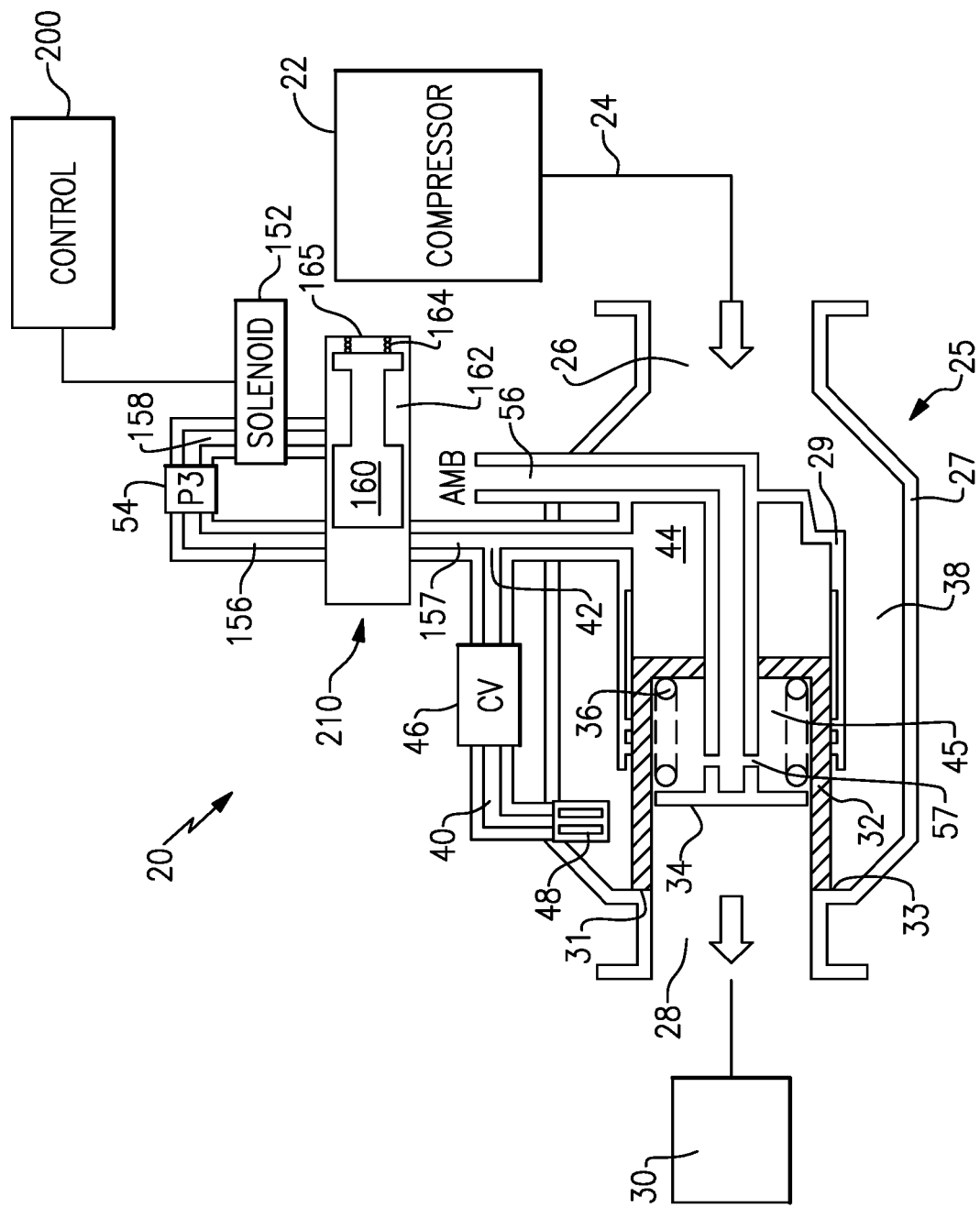
FIG. 4B shows the second embodiment sleeve valve in an open position.

As shown in FIG. 4B, the solenoid has now opened allowing a limited flow of pressurized air from source 54 into the groove 162 to move the piston 160 to the open position, allowing communication of air between the conduits 156 and 157. It should be understood the relay valve 210 is shown schematically, and may be generally known to control flow.

This embodiment has the additional feature that the conduit 156/157 may be larger in area than could be the case if the solenoid 52 alone controls flow of the control high pressure air. That is, by having the relay valve 210, a greater airflow may be sent into the chamber 44 to move the sleeve 32 to the closed position more rapidly.

Figure 5:
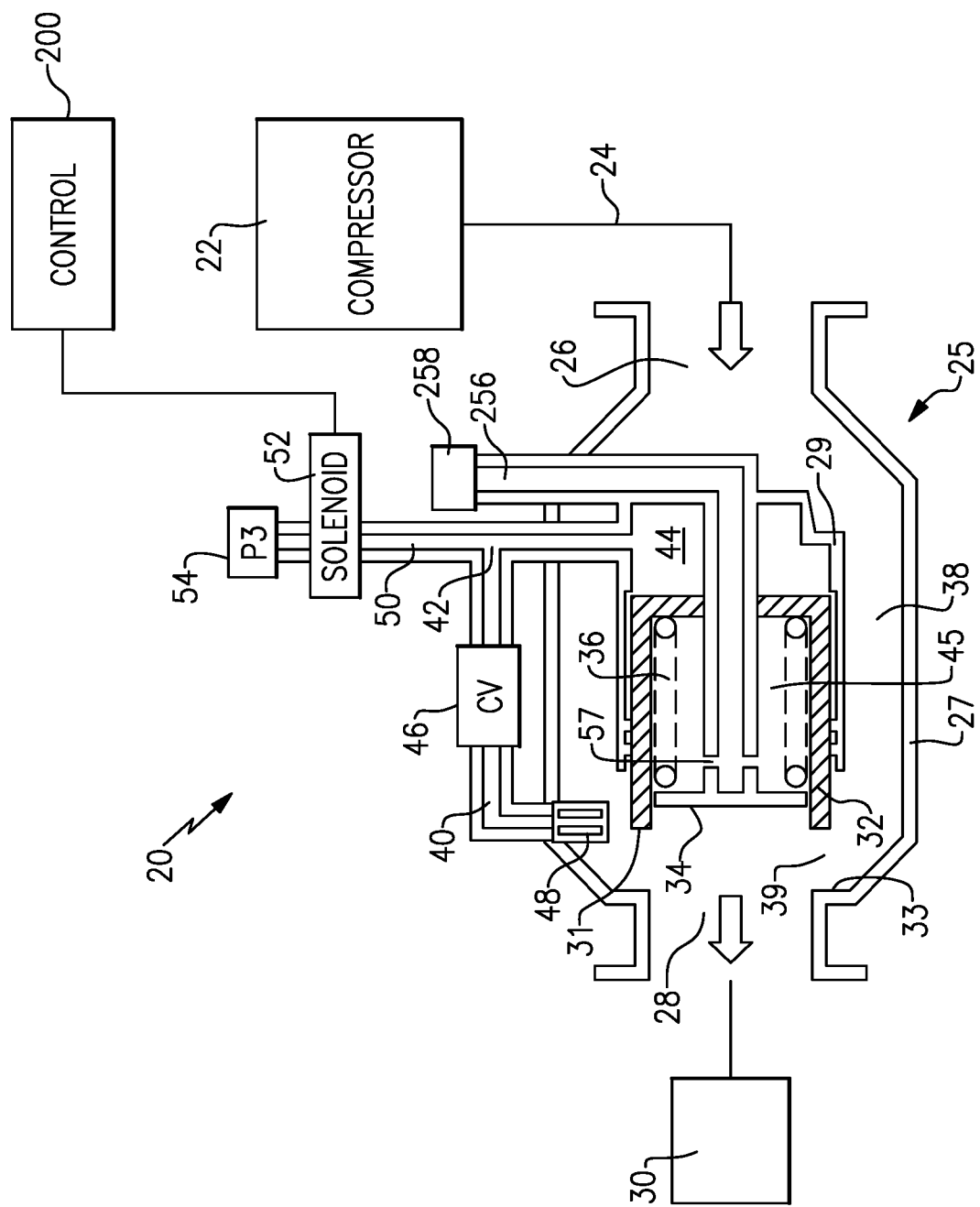
FIG. 5 shows yet another embodiment.

FIG. 5 shows yet another embodiment 220, which is similar to the FIGS. 1-3 embodiment (or the FIG. 4A/4B embodiment) but wherein the tap 56 is now to a pressure source 258. The pressure source 258 will preferably not be unduly high, however, it can be above ambient. This allows the valve to open more rapidly, compared to the ambient embodiment.

The control 200 may be a standalone controller, or it may be incorporated into a full authority digital electronic controller for the engine associated with compressor 22. The control 200 would be programmed as appropriate to achieve the control as disclosed in this application.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. A sleeve valve comprising:
an inlet port and an outlet port, with a fluid chamber connecting the inlet port to the outlet port;
a sleeve valve movable to close flow from the inlet port to the outlet port, the sleeve valve having a sleeve being biased by a spring to an open position at which it allows flow from the inlet port to the outlet port, and the sleeve moving within a housing, and having a pressure chamber on an opposed side of the sleeve from the spring, such that pressure in the pressure chamber urges the sleeve to a closed position at which it blocks flow from the inlet port to the outlet port;
a line pressure conduit communicates the fluid chamber into the pressure chamber;
pressurized air supplied to the pressure chamber through a selectively closed valve, the selectively closed valve being opened to allow the flow of high pressure air from a pressure source through a high pressure conduit into the pressure chamber to move the sleeve to a closed position;
a control valve controls the high pressure air through the high pressure conduit into the pressure chamber when it is open, and a check valve provided on the line pressure conduit to block flow of the high pressure air moving back outwardly into the fluid chamber;
the control valve is a solenoid valve; and
the solenoid valve controls a position of a pressure relay valve, with the solenoid valve received on a first control conduit, and the pressure relay valve blocking flow through the high pressure conduit into the pressure chamber.

2. The sleeve valve as set forth in claim 1, wherein the control valve and the check valve are separate valves.

3. The sleeve valve as set forth in claim 1, wherein a spring chamber is defined on a side of the sleeve receiving the spring, and the spring chamber communicating with a tap to a pressure source.

4. The sleeve valve as set forth in claim 3, wherein the pressure source is an ambient pressure.

5. The sleeve valve as set forth in claim 3, wherein the tapped pressure is above an ambient pressure.

6. The sleeve valve as set forth in claim 1, wherein an electric control is programmed to control the solenoid to achieve the flow of high pressure air into the pressure chamber based upon system conditions.

7. The sleeve valve as set forth in claim 1, wherein a spring chamber is defined on a side of the sleeve receiving the spring, and the spring chamber communicating with a tap to a pressure source, wherein the pressure source is an ambient pressure.

8. The sleeve valve as set forth in claim 1, wherein a spring chamber is defined on a side of the sleeve receiving the spring, and the spring chamber communicating with a tap to a pressure source, wherein the tapped pressure is above an ambient pressure.

9. A bleed air system for a gas turbine engine comprising:
a compressor, the compressor having a bleed conduit bleeding into a bleed valve;
the bleed valve having an inlet port and an outlet port, with a fluid chamber connecting the inlet port to the outlet port;
the bleed valve also having a sleeve movable to close flow from the inlet port to the outlet port, the sleeve valve having a sleeve being biased to an open position at which it allows flow from the inlet port to the outlet port by a spring, and the sleeve moving within a housing, and having a pressure chamber on opposed side of the sleeve from the spring, such that pressure in the pressure chamber urges the sleeve to a closed position at which it blocks flow from the inlet port to the outlet port;
a line pressure conduit communicates the fluid chamber into the pressure chamber;
pressurized air supplied to the pressure chamber through a selectively closed valve, the selectively closed valve being opened to allow the flow of high pressure air from a pressure source through a high pressure conduit into the pressure chamber through a high pressure conduit to move the sleeve to a closed position; and
a control valve controls the high pressure air through the high pressure conduit into the pressure chamber when it is open, and a check valve provided on the line pressure conduit to block flow of the high pressure air moving back outwardly into the fluid chamber, and the control valve is separate from the check valve; where in the control valve controls the position of the selectively closed valve.

10. The bleed air system as set forth in claim 9, wherein a spring chamber is defined on a side of the sleeve receiving the spring, and the spring chamber communicating with a tap to a pressure source.

11. The bleed air system as set forth in claim 10, wherein the pressure source is an ambient pressure.

12. The bleed air system as set forth in claim 10, wherein the tapped pressure is above an ambient pressure.

13. The bleed air system as set forth in claim 9, wherein the control valve is a solenoid valve.

14. The bleed air system as set forth in claim 13, wherein an electric control is programmed to control the solenoid to achieve the flow of high pressure air into the pressure chamber based upon system conditions.

15. The bleed air system as set forth in claim 9, wherein a spring chamber is defined on a side of the sleeve receiving the spring, and the spring chamber communicating with a tap to a pressure source, wherein the pressure source is an ambient pressure.

16. The bleed air system as set forth in claim 9, wherein a spring chamber is defined on a side of the sleeve receiving the spring, and the spring chamber communicating with a tap to a pressure source, wherein the tapped pressure is above an ambient pressure.

17. A bleed air system for a gas turbine engine comprising:
   a compressor, the compressor having a bleed conduit bleeding into a bleed valve;
   the bleed valve having an inlet port and an outlet port, with a fluid chamber connecting the inlet port to the outlet port;
   the bleed valve also having a sleeve movable to close flow from the inlet port to the outlet port, the sleeve valve having a sleeve being biased to an open position at which it allows flow from the inlet port to the outlet port by a spring, and the sleeve moving within a housing, and having a pressure chamber on opposed side of the sleeve from the spring, such that pressure in the pressure chamber urges the sleeve to a closed position at which it blocks flow from the inlet port to the outlet port;
   a line pressure conduit communicates the fluid chamber into the pressure chamber;
   pressurized air supplied to the pressure chamber through a selectively closed valve, the selectively closed valve being opened to allow the flow of high pressure air from a pressure source through a high pressure conduit into the pressure chamber through a high pressure conduit to move the sleeve to a closed position;
   a control valve controls the high pressure air through the high pressure conduit into the pressure chamber when it is open, and a check valve provided on the line pressure conduit to block flow of the high pressure air moving back outwardly into the fluid chamber;
   the control valve is a solenoid valve; and
   wherein the solenoid valve controls a position of a pressure relay valve, with the solenoid valve received on a first control conduit, and the pressure relay valve blocking flow through the high pressure conduit into the pressure chamber.

* * * * *